United States Patent
Nakanishi et al.

(10) Patent No.: US 8,331,630 B2
(45) Date of Patent: Dec. 11, 2012

(54) FACE FEATURE POINT DETECTION DEVICE AND PROGRAM

(75) Inventors: Satoru Nakanishi, Aichi-ken (JP); Yoshiki Ninomiya, Nagoya (JP); Takashi Naito, Tajimi (JP); Shinichi Kojima, Nisshin (JP); Yoshinao Takemae, Yokohama (JP); Takuhiro Omi, Anjo (JP); Jun Adachi, Obu (JP); Takashi Hiramaki, Nagoya (JP)

(73) Assignees: Aisin Seiki Kabushiki Kaisha, Aichi-ken (JP); Denso Corporation, Aichi-Pref. (JP)

( * ) Notice: Subject to any disclaimer, the term of this patent is extended or adjusted under 35 U.S.C. 154(b) by 0 days.

(21) Appl. No.: 13/259,065

(22) PCT Filed: Mar. 26, 2010

(86) PCT No.: PCT/JP2010/055454
§ 371 (c)(1),
(2), (4) Date: Sep. 22, 2011

(87) PCT Pub. No.: WO2010/113821
PCT Pub. Date: Oct. 7, 2010

(65) Prior Publication Data
US 2012/0014610 A1 Jan. 19, 2012

(30) Foreign Application Priority Data
Apr. 2, 2009 (JP) .................. 2009-090065

(51) Int. Cl.
*G06K 9/00* (2006.01)
*G06K 9/46* (2006.01)
(52) U.S. Cl. ...................... 382/117; 382/195
(58) Field of Classification Search .................. 382/117
See application file for complete search history.

(56) References Cited

U.S. PATENT DOCUMENTS
7,957,566 B2 * 6/2011 Suzuki et al. ................. 382/117
(Continued)

FOREIGN PATENT DOCUMENTS
FR 2 920 938 A1 3/2009
(Continued)

OTHER PUBLICATIONS

International Search Report issued in International Application No. PCT/JP2010/055454 dated May 25, 2010.

(Continued)

*Primary Examiner* — David Zarka
(74) *Attorney, Agent, or Firm* — Sughrue Mion, PLLC

(57) ABSTRACT

Detecting with good precision an eye inside corner position and an eye outside corner position as face feature points even when the eye inside corner and/or the eye outside corner portions are obscured by noise. First eyelid profile modeling is performed with a Bezier curve expressed by a fixed control point $P_3$ indicating an eye inside corner first position detected in an image, a fixed control point $P_4$ indicating an eye outside corner first position, a control point $P_1$ corresponding to an upper eyelid position candidate (first parameter), and a control point $P_2$ corresponding to a lower eyelid position candidate (second parameter). Then in a second eyelid profile model with fixed $P_1$ and $P_2$ of the first eyelid profile model having the highest fitting evaluation value $\lambda$ to the eyelid profile in the image, the values of a control point $P_3$ indicating an eye inside corner position candidate (third parameter) and a control point $P_4$ indicating an eye outside corner candidate (fourth parameter) at a maximum of a fitting evaluation value $\lambda$ when changing the values of the control point $P_3$ and control point $P_4$ are determined as an eye inside corner second position and an eye outside corner second position, respectively.

7 Claims, 17 Drawing Sheets

U.S. PATENT DOCUMENTS

| | | | |
|---|---|---|---|
| 2007/0071289 A1* | 3/2007 | Takeguchi et al. | 382/118 |
| 2007/0230797 A1* | 10/2007 | Hisanaga | 382/195 |
| 2009/0010544 A1 | 1/2009 | Li et al. | |
| 2010/0027890 A1* | 2/2010 | Yoshinaga et al. | 382/195 |
| 2010/0054548 A1* | 3/2010 | Inada | 382/117 |
| 2010/0061639 A1* | 3/2010 | Godreau | 382/201 |
| 2010/0189357 A1* | 7/2010 | Robin et al. | 382/195 |
| 2010/0202658 A1* | 8/2010 | Ishida et al. | 382/103 |

FOREIGN PATENT DOCUMENTS

| | | |
|---|---|---|
| JP | 2007-094906 A | 4/2007 |
| JP | 2007-213377 A | 8/2007 |
| JP | 2007-265367 A | 10/2007 |
| JP | 2009-003644 A | 1/2009 |
| WO | 02/09025 A1 | 1/2002 |

OTHER PUBLICATIONS

Kuo P et al: "An Improved Eye Feature Extraction Algorithm Based on Deformable Templates", vol. 2, Sep. 11, 2005, pp. 1206-1209.

Hammal Z et al: "Parametric models for facial features segmentation", vol. 86, No. 2, Feb. 1, 2006, pp. 399-413.

Kin-Man Lam Hong Yan: "Locating and extracting the eye in human face images", vol. 29, No. 5, May 1, 1996, pp. 771-779.

* cited by examiner

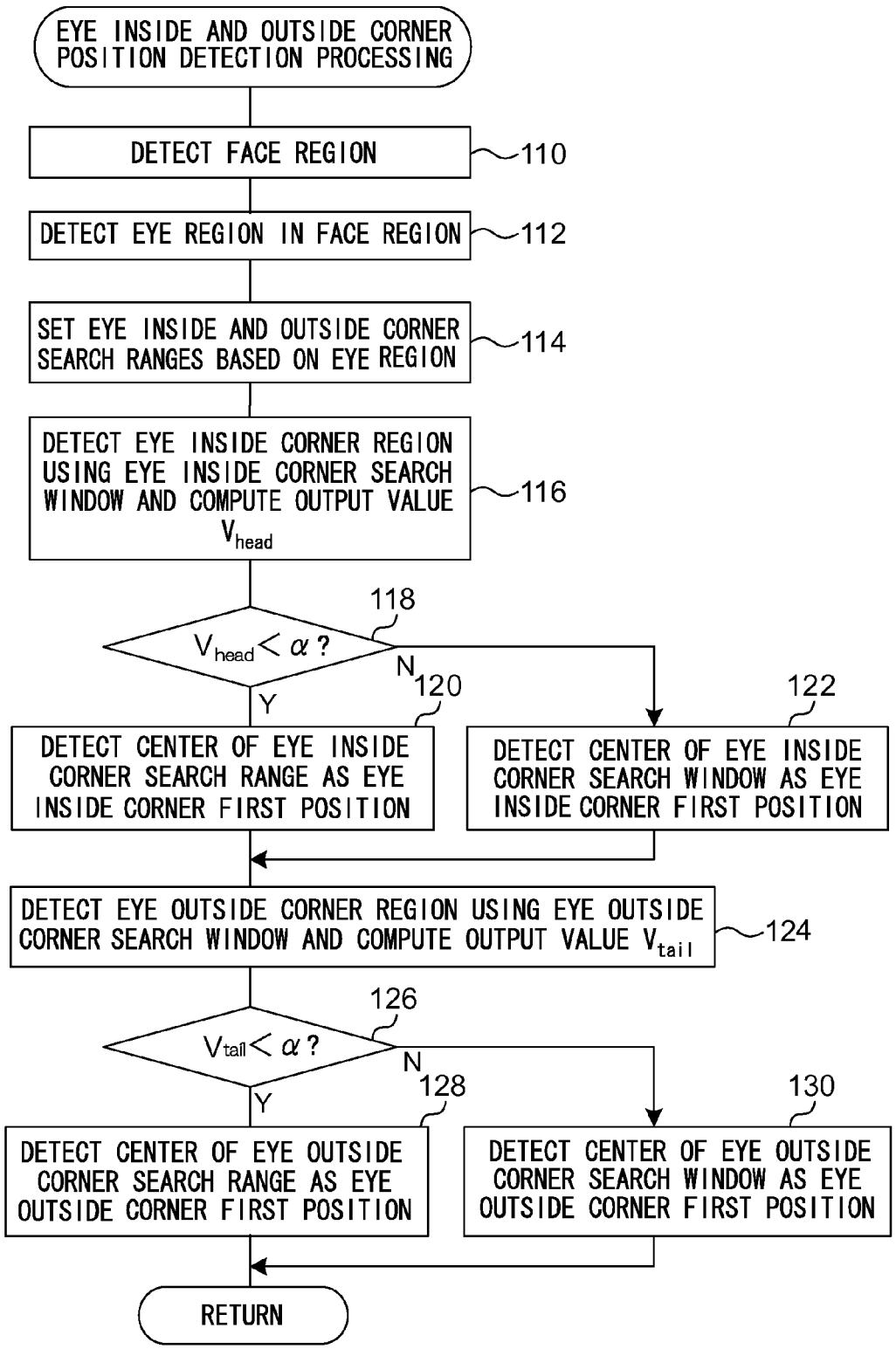

FACE FEATURE POINT DETECTION DEVICE AND PROGRAM

TECHNICAL FIELD

The present invention relates to a face feature point detection device and program, and in particular to a face feature point detection device and program for detecting an eye inside corner position and an eye outside corner position as face feature points.

BACKGROUND ART

In an existing proposal for a face feature point detection method a face is detected in an image subject for detection, detection data of the face is employed to detect the eyes configuring the face, and the detection data of the eyes is employed in a face feature point detection method for detecting the inside corner and outside corner of the eye. In this method a learning discriminator created in advance using plural sample images is employed to detect the eye inside corner and the eye outside corner (see, for example, Patent Document 1).

There is also a proposal for a face feature point detection device that uses a corner detection method to detect intersections of an upper eyelid edge and a lower eyelid edge as eye outside and inside corner candidate points, cuts out a peripheral pattern at the detected candidate points, and calculates a degree of likeness to pre-stored templates of eye outside corners and eye inside corners in order to detect eye outside corner candidate points and eye inside corner candidate points of high degree of likeness as the eye outside corner and the eye inside corner (see, for example, Patent Document 2).

Patent Document 1: Japanese Patent Application Laid-Open (JP-A) No. 2007-213377
Patent Document 2: JP-A No. 2007-94906

DISCLOSURE OF INVENTION

Technical Problem

However, in the technology of Patent Document 1, whilst discrimination can be made of likeness to an eye outside corner or an eye inside corner in the region for detection using the learning discriminator there is an issue in that the precision with which eye outside corner positions and eye inside corner positions are detected as face feature points is poor. In order to improve the detection precision a high precision learning discriminator needs to be generated and stored, with problems associated with the increase in computation time and volume of memory required.

In the technology of Patent Document 2, the degree of likeness to a template is calculated by the corner detection method for a very small range at the periphery of the detected candidate points, and so problems with the detection of eye outside and inside corner positions arise when the eye outside corner and/or the eye inside corner is obscured by noise, such as reflection from glasses.

The present invention addresses the above issues and is directed towards provision of a face feature point detection device and program capable of detecting with good precision eye inside corner positions and eye outside corner positions as face feature points, even when the eye inside corner and/or the eye outside corner portions are obscured by noise, such as by reflection from glasses.

Solution to Problem

In order to address the above issues, a face feature point detection device of the present invention is configured with: acquiring means that acquires image data for an image including an eye region containing an eye inside corner and an eye outside corner; position detection means that detects an eye inside corner first position and an eye outside corner first position by pattern matching in the image data acquired by the acquiring means; first computation means that, in a first eyelid profile model expressing an upper curve and a lower curve, with end points at the eye inside corner first position and the eye outside corner first position detected by the position detection means, and having an upper eyelid position determined on the upper curve as a first parameter and a lower eyelid position determined on the lower curve as a second parameter, computes for each value of the first parameter and each value of the second parameter a first likelihood expressing the degree of matching between the first eyelid profile model while changing the first parameter and the second parameter and an eyelid profile included in the image; second computation means that, in a second eyelid profile model of the first eyelid profile model having the highest first likelihood computed by the first computation means and having an eye inside corner position as a third parameter and an eye outside corner position as a fourth parameter, computes for each value of the third parameter and each value of the fourth parameter a second likelihood expressing the degree of matching between the second eyelid profile model while changing the third parameter and the fourth parameter and the eyelid profile included in the image; and position determination means that determines the position expressed by the third parameter and the position expressed by the fourth parameter in the second eyelid profile model at the highest second likelihood computed by the second computation means as the positions of an eye inside corner second position and an eye outside corner second position, respectively.

A face feature point detection program of the present invention is a program causing a computer to function as: acquiring means that acquires image data for an image including an eye region containing an eye inside corner and an eye outside corner; position detection means that detects an eye inside corner first position and an eye outside corner first position by pattern matching in the image data acquired by the acquiring means; first computation means that, in a first eyelid profile model expressing an upper curve and a lower curve, with end points at the eye inside corner first position and the eye outside corner first position detected by the position detection means, and having an upper eyelid position determined on the upper curve as a first parameter and a lower eyelid position determined on the lower curve as a second parameter, computes for each value of the first parameter and each value of the second parameter a first likelihood expressing the degree of matching between the first eyelid profile model while changing the first parameter and the second parameter and an eyelid profile included in the image; second computation means that, in a second eyelid profile model of the first eyelid profile model having the highest first likelihood computed by the first computation means and having an eye inside corner position as a third parameter and an eye outside corner position as a fourth parameter, computes for each value of the third parameter and each value of the fourth parameter a second likelihood expressing the degree of matching between the second eyelid profile model while changing the third parameter and the fourth parameter and the eyelid profile included in the image; and position determination means that determines the position expressed by the third parameter and the position expressed by the fourth parameter in the second eyelid profile model at the highest second likelihood computed by the second computation means as the positions of an eye inside corner second position and an eye outside corner second position, respectively.

According to the face feature point detection device and program of the present invention, the acquiring means acquires image data for an image including an eye region containing an eye inside corner and an eye outside corner and the position detection means detects an eye inside corner first position and an eye outside corner first position by pattern matching in the image data acquired by the acquiring means. Sometimes the eye inside corner first position or the eye outside corner first position cannot be detected with good precision since there is sometimes noise present in the vicinity of the eye inside corner or the eye outside corner. The first computation means, in a first eyelid profile model expressing an upper curve and a lower curve, with end points at the eye inside corner first position and the eye outside corner first position detected by the position detection means, and having an upper eyelid position determined on the upper curve as a first parameter and a lower eyelid position determined on the lower curve as a second parameter, computes for each value of the first parameter and each value of the second parameter a first likelihood expressing the degree of matching between the first eyelid profile model while changing the first parameter and the second parameter and an eyelid profile included in the image. The second computation means, in a second eyelid profile model of the first eyelid profile model having the highest first likelihood computed by the first computation means and having an eye inside corner position as a third parameter and an eye outside corner position as a fourth parameter, computes for each value of the third parameter and each value of the fourth parameter a second likelihood expressing the degree of matching between the second eyelid profile model while changing the third parameter and the fourth parameter and the eyelid profile included in the image. The position determination means determines the position expressed by the third parameter and the position expressed by the fourth parameter in the second eyelid profile model at the highest second likelihood computed by the second computation means as the positions of an eye inside corner second position and an eye outside corner second position, respectively.

In the second eyelid profile model of the first eyelid profile model having the highest likelihood to the eyelid profile included in the image and having an eye inside corner position as a third parameter and an eye outside corner position as a fourth parameter, by thus determining the position expressed by the third parameter and the position expressed by the fourth parameter in the second eyelid profile model with the highest likelihood to the eyelid profile included in the image as the positions of an eye inside corner second position and an eye outside corner second position, respectively, the eye inside corner position and the eye outside corner position can be detected with good precision as face feature points even when the eye inside corner and/or the eye outside corner portions are obscured by noise, such as by reflection in glasses.

The second computation means of the present invention may be configured to compute the second likelihood by at least one of employing a portion in the vicinity of the upper eyelid position or the lower eyelid position of the second eyelid profile model out of the eyelid profiles included in the image when the degree of matching by pattern matching with the position detection means is less than a predetermined threshold value. Since there is a high probability that noise is present in the vicinity of the eye inside corner and/or the eye outside corner when the degree of matching by pattern matching with the position detection means is less than the predetermined threshold value, by only employing portions in the vicinity of the upper eyelid position and the lower eyelid position of the second eyelid profile model when computing the second likelihood the likelihood can be computed with influence from noise excluded.

The position detection means of the present invention can be configured so as to detect at least one of plural eye inside corner candidate points as an eye inside corner first position or plural eye outside corner candidate points as an eye outside corner first position when the degree of matching by pattern matching is less than a predetermined threshold value, with the first computation means computing the first likelihood for all combinations of the eye inside corner candidate points and the eye outside corner candidate points in a first eyelid profile model having as end points a single eye inside corner candidate point selected from the plural eye inside corner candidate points and a single eye outside corner candidate point selected from the plural eye outside corner candidate points. Accordingly a flexible first eyelid profile model can be set, and parameters can be determined with high likelihood.

The second computation means of the present invention may be configured to change the third parameter and the fourth parameter within a predetermined range when the separation distance between the upper eyelid position and the lower eyelid position in the second eyelid profile model is smaller than a predetermined openness threshold value. Since detection of the eye inside corner position and/or the eye outside corner position may be detected at positions misplaced from the actual eye inside corner and/or the eye outside corner due to being affected by creases when there is a small degree of eye openness, large misplaced detection of the eye inside corner position and the eye outside corner position can be prevented by configuring so as to change the third parameter and fourth parameter only within the predetermined ranges.

The face feature point detection device of the present invention may be configured further including control means that, when at least one of a difference between the eye inside corner second position determined the current time by the position determination means and the eye inside corner first position, or the difference between from the eye outside corner second position determined the current time by the position determination means and the eye outside corner first position is greater than a difference threshold value predetermined the previous time, and controls so as to use at least one of the eye inside corner second position, the eye outside corner second position determined the current time to replace the eye inside corner first position, or the eye outside corner first position, and then controls to re-determine an eye inside corner second position and an eye outside corner second position. The detection precision is thereby raised.

The face feature point detection program of the present invention is a program that causes a computer to function as each of the means configuring the face feature point detection device of the present invention.

Advantageous Effects of Invention

As explained above, according to the face feature point detection device and program of the present invention, due to detecting the eye inside corner position and the eye outside corner position as parameters in an eyelid profile model of high likelihood to an eyelid profile, the eye inside corner position and the eye outside corner position can be detected with good precision as face feature points even when the eye inside corner and/or the eye outside corner portions are obscured by noise, such as reflection from glasses.

BRIEF DESCRIPTION OF DRAWINGS

FIG. 3 is a flow chart showing contents of a processing routine of eye inside and outside corner position detection processing in the first exemplary embodiment.

DESCRIPTION OF EMBODIMENTS

Explanation follows regarding details of exemplary embodiments of a face feature point detection device of the present invention, with reference to the drawings.

Figure 1:
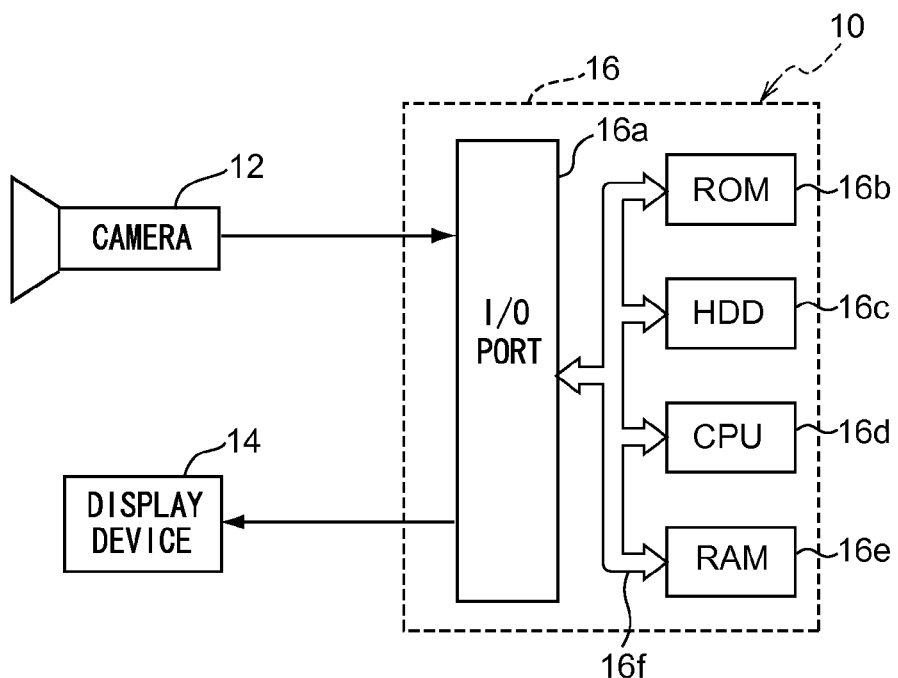
FIG. 1 is a block diagram illustrating a configuration of a face feature point detection device according to an exemplary embodiment.

As shown in FIG. 1, a face feature point detection device 10 of a first exemplary embodiment is equipped with a camera 12 for capturing an image of an imaging subject, a display device 14, and a computer 16.

The display device 14 is configured by a Liquid Crystal Display (LCD) or a Cathode Ray Tube (CRT) for performing display based on input data.

The computer 16 is configured including: an input-output (I/O) port 16$a$; a Read Only Memory (ROM) 16$b$; a Hard Disk Drive (HDD) 16$c$; a Central Processing Unit (CPU) 16$d$; a Random Access Memory (RAM) 16$e$; and a bus 16$f$ that connects together the I/O port 16$a$, the ROM 16$b$, the HDD 16$c$, the CPU 16$d$ and the RAM 16$e$.

Various programs, such as base programs like an OS, and a face feature point detection program for executing a processing routine for face feature point detection processing, described later, are stored, together with various data, on storage media of the ROM 16$b$ and/or the HDD 16$c$.

The CPU 16$d$ reads out and executes programs from the ROM 16$b$ and/or the HDD 16$c$ and temporarily stores various data on the RAM 16$e$.

The camera 12 and the display device 14 are connected to the I/O port 16$a$.

Figure 2:
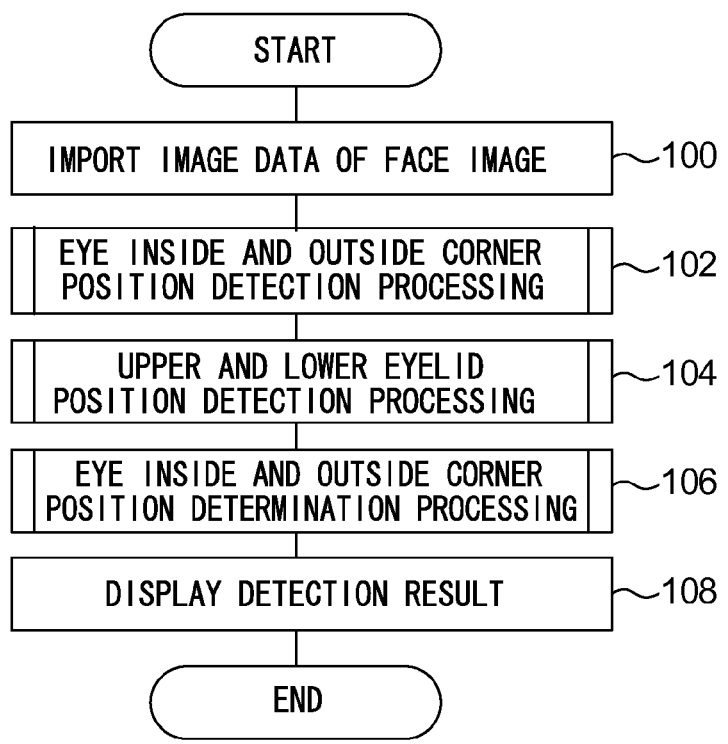
FIG. 2 is a flow chart showing contents of a processing routine of face feature point detection processing in a face feature point detection device of a first exemplary embodiment.

Explanation follows, with reference to FIG. 2, regarding a processing routine for face feature point detection processing in the face feature point detection device of the first exemplary embodiment. The current routine is executed by the CPU 16$d$ of the computer 16 every specific time interval (for example every few tens of msec) from the point in time when a switch (not shown in the drawings) of the face feature point detection device 10 is switched ON.

At step 100 image data of a face image captured by the camera 12 is imported. Then at step 102 eye inside and outside corner position detection processing is executed to detect an eye inside corner first position and an eye outside corner first position in the interference microscope based on the image data imported at step 100. Then at step 104 upper and lower eyelid position detection processing is executed to detect an upper eyelid position and a lower eyelid position based on the eye inside corner first position and the eye outside corner first position detected at step 102. Then at step 106 eye inside and outside corner position determination processing is executed for determining an eye inside corner second position and an eye outside corner second position based on the upper eyelid position and the lower eyelid position detected at step 104. Then at step 108 display on the display device 14 is controlled so as to display the eye inside corner second position and the eye outside corner second position determined at step 106 as detection results for the eye inside corner position and the eye outside corner position.

Explanation follows, with reference to FIG. 3, regarding a processing routine for eye inside and outside corner position detection processing executed in step 102 in the processing routine for the above face feature point detection processing (FIG. 2).

Figure 4A:
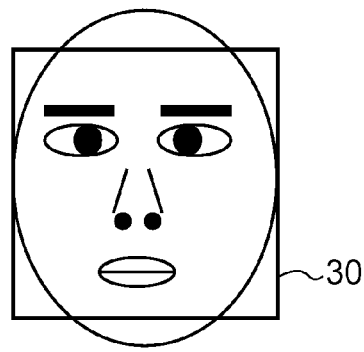
FIG. 4A is an explanatory diagram of detecting a face region.

At step 110, as shown in FIG. 4A, a face region 30, for example a rectangular shaped region, is detected in the image using a method such as template matching.

Figure 4B:
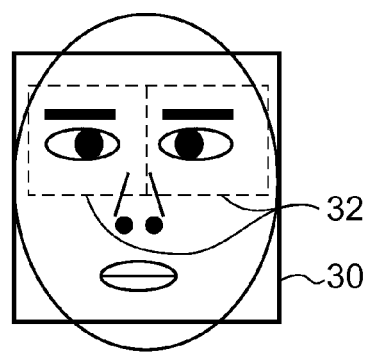
FIG. 4B is an explanatory diagram of setting an eye search range.
Figure 4C:
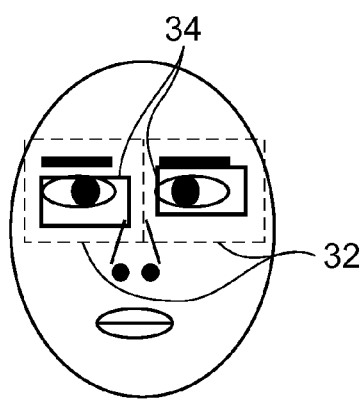
FIG. 4C is an explanatory diagram of detecting an eye region.

Then at step 112 an eye search range 32 is set for the face region 30 detected at step 110, as shown in FIG. 4B. The eye search range 32 is set according to such aspects as the size of the detected face region 30, and sets a search range for the left eye and the right eye in the face region 30 where the eyes are expected to be present. Then, as shown in FIG. 4C, an eye region 34, for example a rectangular shaped region, is detected in the set eye search range 32 using a method such as template matching.

Figure 5:
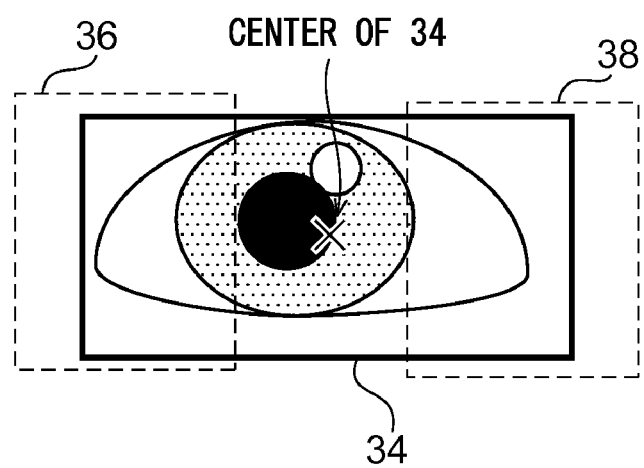
FIG. 5 is an explanatory diagram of setting an eye inside corner search range and an eye outside corner search range.

Then at step 114, as shown in FIG. 5, an eye inside corner search range 36 and an eye outside corner search range 38 are set based on the eye region 34 detected at step 112. The eye inside corner search range 36 can be set for the left eye, for example, as the right hand side region and its peripheral region when the eye region has been segmented into 3 in the across direction. Subsequent processing from the current step onwards is performed for each of the right eye and the left eye, however explanation is given here regarding processing for the left eye, and since the processing for the right eye is similar further explanation is omitted.

Figure 6:
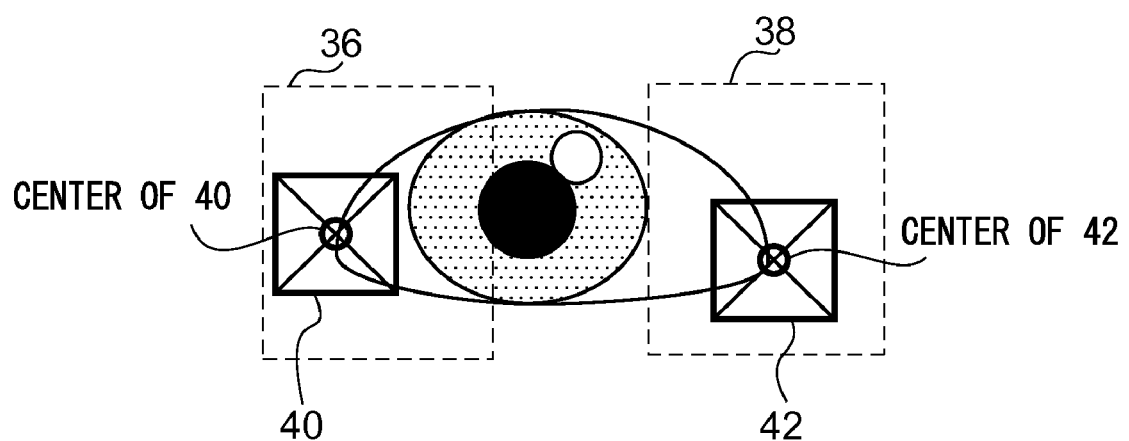
FIG. 6 is an explanatory diagram for detecting an eye inside corner region.

Next at step 116, as shown in FIG. 6, an eye inside corner search window 40, for example a rectangular shaped region, is scanned over the eye inside corner search range 36 that was set at step 114, and an output value $V_{head}$ expressing the degree of matching between the image of the eye inside corner region and a template is computed using a method such as template matching.

Figure 7:
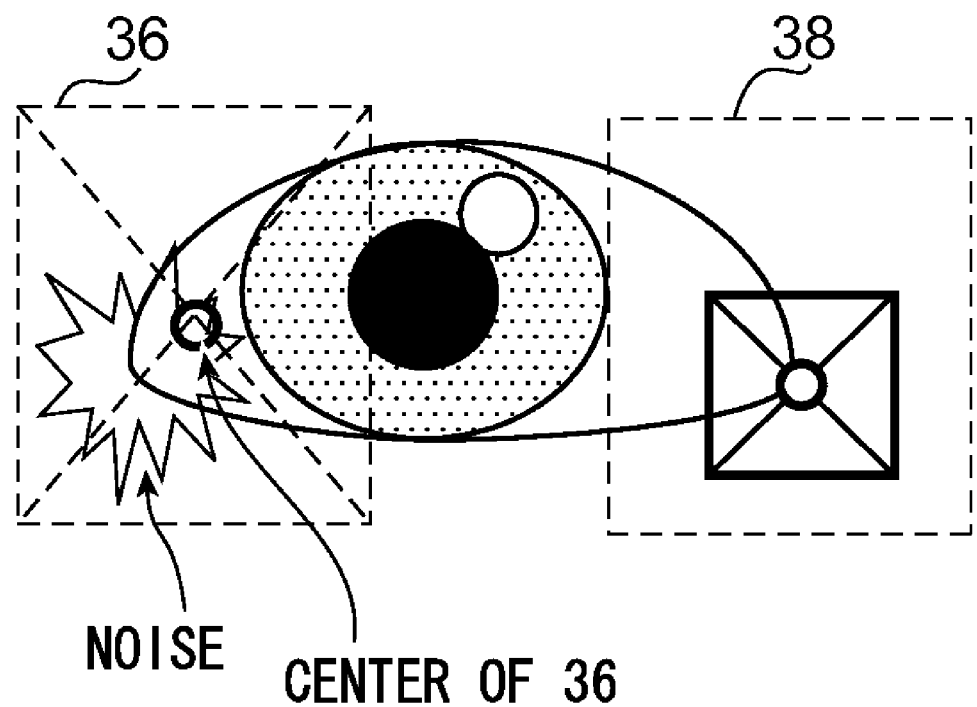
FIG. 7 is an explanatory diagram of detecting an eye inside corner first position.

Then at step 118 determination is made as to whether or not the output value $V_{head}$ computed at step 116 is smaller than a predetermined threshold value $\alpha$. When the output value $V_{head}$ is small, namely when there is a low degree of matching to a template, it can be determined that there is a high probability the eye inside corner region has been affected by noise, such as reflection from glasses. The threshold value $\alpha$ is predetermined as a value that can determine the presence or absence of noise. Processing proceeds to step 120 when the output value $V_{head} < \alpha$ and, as shown in FIG. 7, the center of the eye inside corner search range 36 is detected as the eye inside corner first position. However, processing proceeds to step 122 when the output value $V_{head} \geq \alpha$, and, as shown in FIG. 6, the center of the eye inside corner region (the eye inside corner search window 40) is detected as the eye inside corner first position.

The eye inside corner first position is defined in coordinates (x, y) corresponding to pixels on the image. This also applies to the eye outside corner first position, the upper eyelid position, the lower eyelid position and the like, as described later.

Then in steps 124 to 130, by using processing similar to the processing employed to detect the eye inside corner first position, an eye outside corner search window 42 is employed to compute an output value $V_{tail}$, an eye outside corner first position is detected, and then processing returns.

Figure 8:
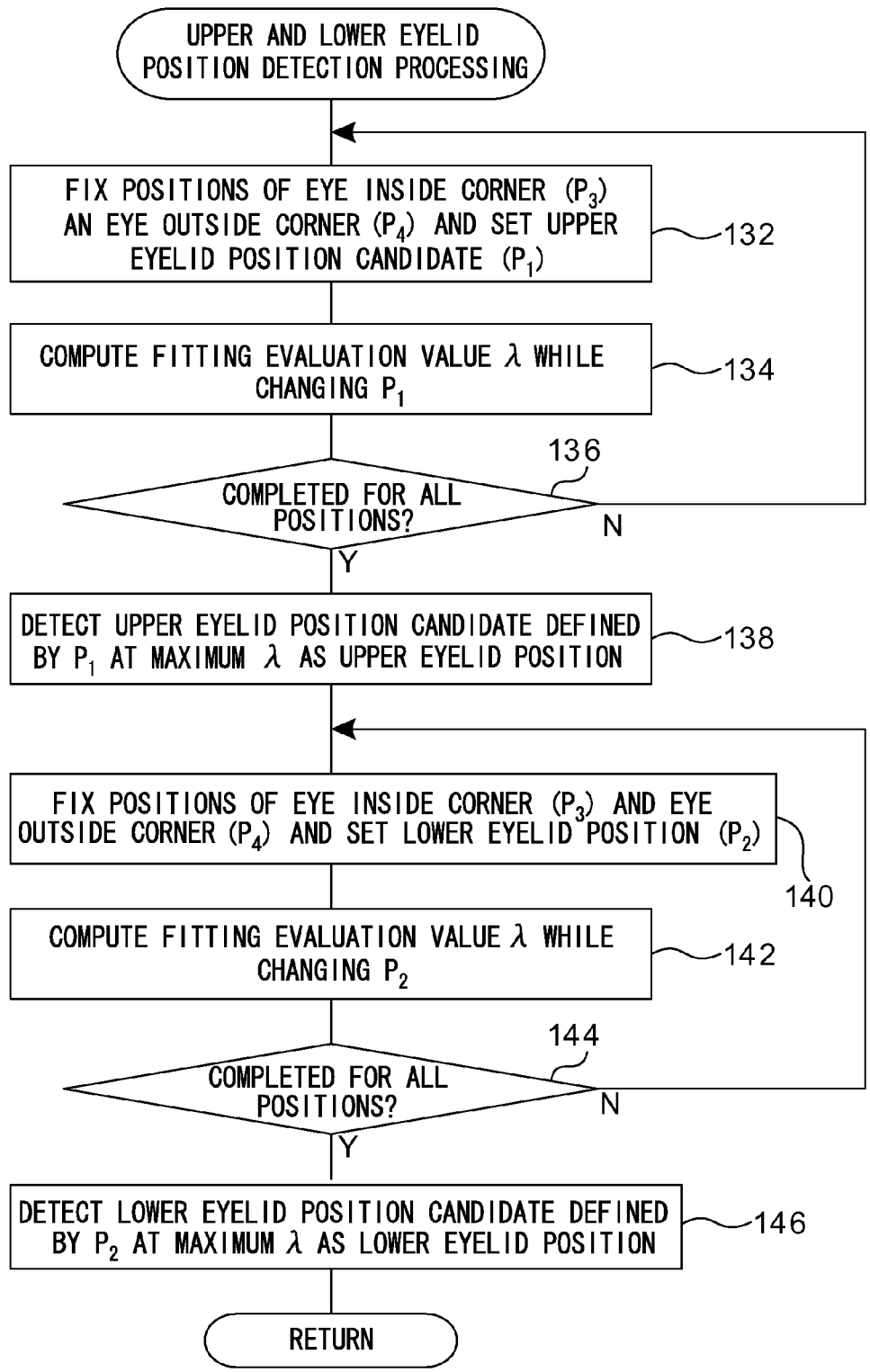
FIG. 8 is a flow chart showing contents of a processing routine of upper and lower eyelid position detection processing in the first exemplary embodiment.

Explanation follows, with reference to FIG. 8, regarding a processing routine for upper and lower eyelid position detection processing executed at step 104 of the processing routine for face feature point detection processing (FIG. 2).

Figure 9A:
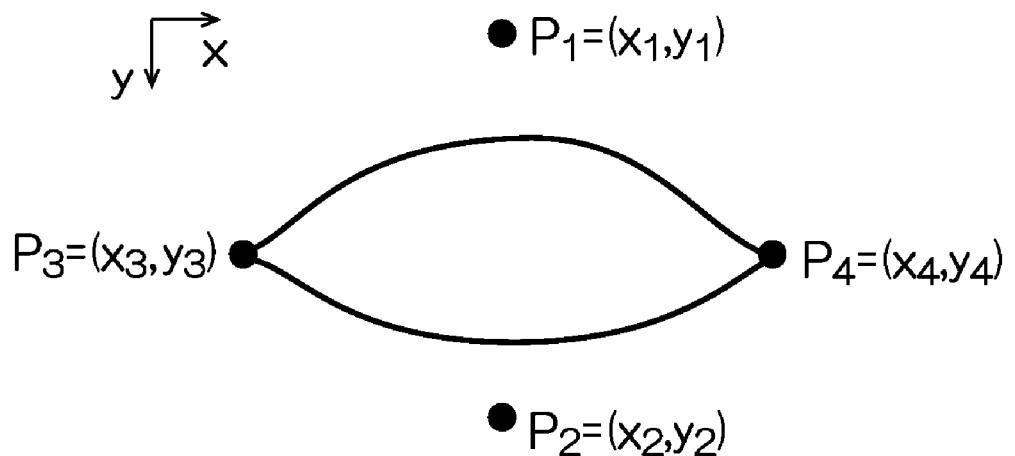
FIG. 9A is an explanatory diagram of Bezier curves and control points as an eyelid profile model.
Figure 9B:
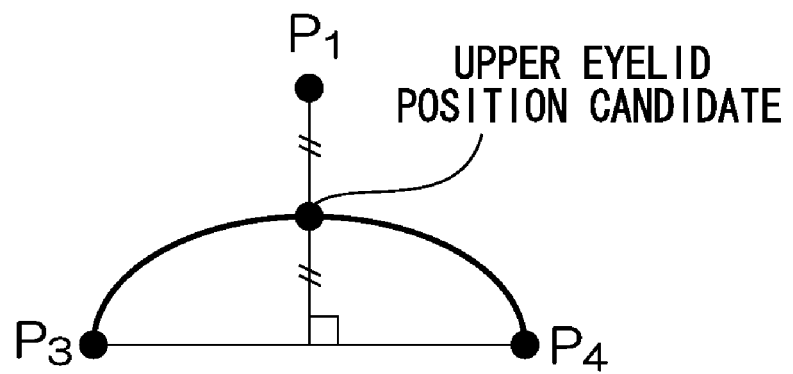
FIG. 9B is an explanatory diagram of a relationship between a control point $P_1$ and an upper eyelid position candidate.

At step 132, as shown in FIG. 9A, the eye inside corner first position detected by the eye inside corner position detection processing is set as a control point $P_3$, the eye outside corner first position as a control point $P_4$, and a control point $P_1$ is set corresponding to an upper eyelid position. The control points $P_3$ and $P_4$ are fixed. Upper eyelid profile modeling is performed as a Bezier curve defined based on the control points $P_1$, $P_3$, and $P_4$. As shown in FIG. 9B, the center point of a line dropping down from the control point $P_1$ and perpendicular to the line segment with end points at the control points $P_3$ and $P_4$ defines an upper eyelid position candidate.

Then at step 134 a fitting evaluation value $\lambda$ is computed according to the following Equation (1), while changing control point $P_1$.

$$\lambda = \frac{\sum_{i=1}^{n} p_i \cdot e_i}{n} \quad (1)$$

In the above $p_i$ is a normal vector on a Bezier curve at point i, $e_i$ is the brightness gradient vector of the image at point i, and n is the number of points i on the Bezier curve. The likelihood of the Bezier curve and the eyelid profile included in the image is computed from the inner product of the normal vector and the brightness gradient vector of the image at point i. The range over which control point $P_1$ is changed can, for example, be set as a range above the straight line passing through the control points $P_3$ and $P_4$ falling inside the eye search range 32.

Figure 10:
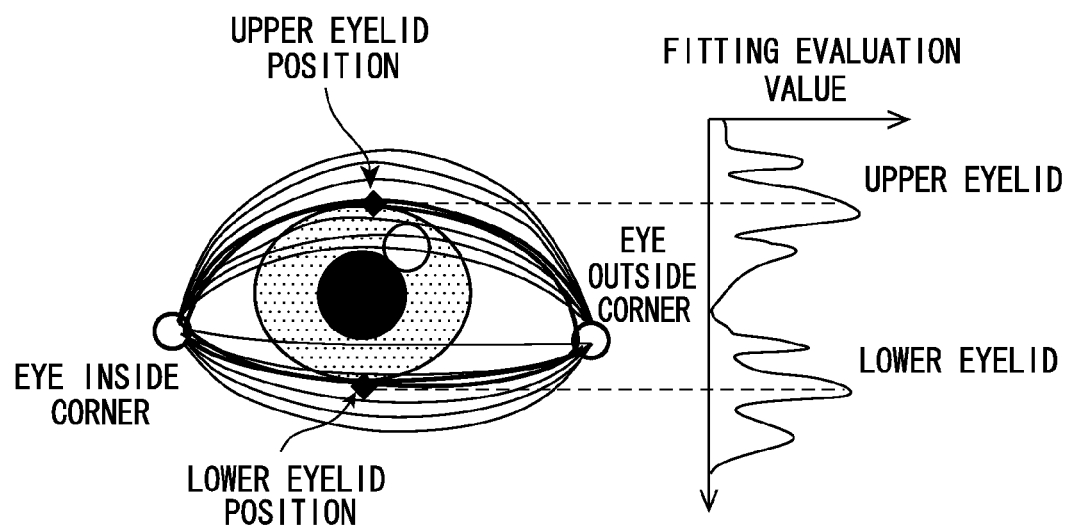
FIG. 10 is an explanatory diagram of a relationship between fitting evaluation values and upper and lower eyelid positions.

Then at step 136 determination is made as to whether or not control point $P_1$ has been changed and the fitting evaluation value $\lambda$ computed for all of the positions within the change range. Processing returns to step 132 when not all have been computed, the next position for the control point $P_1$ is set, and computation processing of the fitting evaluation value $\lambda$ is repeated. Processing proceeds to step 138 when computation processing has been completed for all of the positions and, as shown in FIG. 10, the upper eyelid position candidate defined by the control point $P_1$ at the maximum fitting evaluation value $\lambda$ computed is detected as the upper eyelid position.

Then at step 140 to 146 similar processing is performed to the processing for detecting the upper eyelid position, but this time using the control point $P_2$ corresponding to the lower eyelid position, computing fitting evaluation value $\lambda$, and detecting as the lower eyelid position the lower eyelid position candidate defined by the control point $P_2$ at the maximum fitting evaluation value $\lambda$ computed, and then processing returns.

Figure 11:
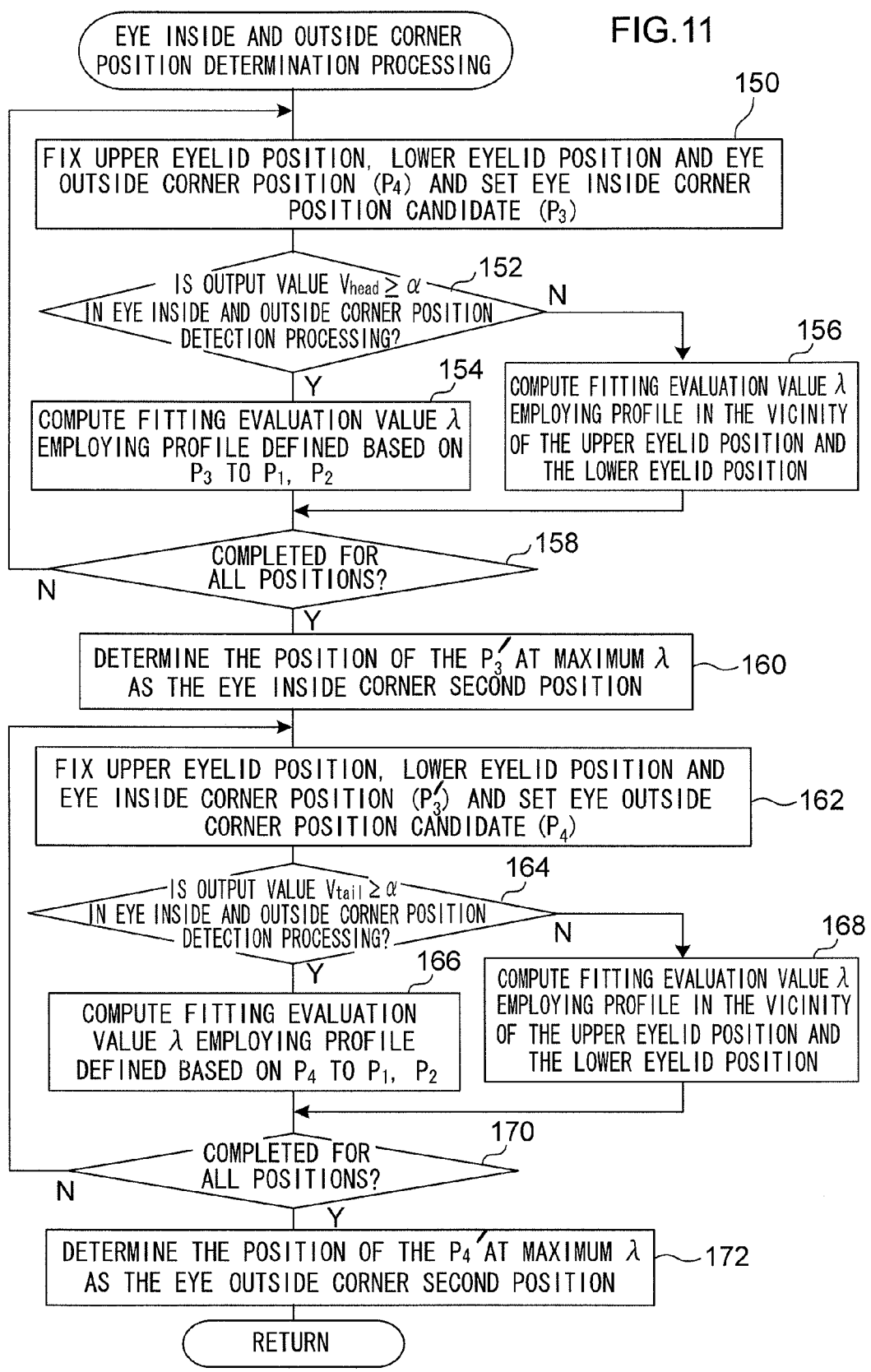
FIG. 11 is a flow chart showing contents of a processing routine of eye inside and outside corner position determination processing in the first exemplary embodiment.

Explanation follows, with reference to FIG. 11, regarding a processing routine for eye inside and outside corner position detection processing executed at step 106 of the processing routine for face feature point detection processing (FIG. 2).

Figure 12A:
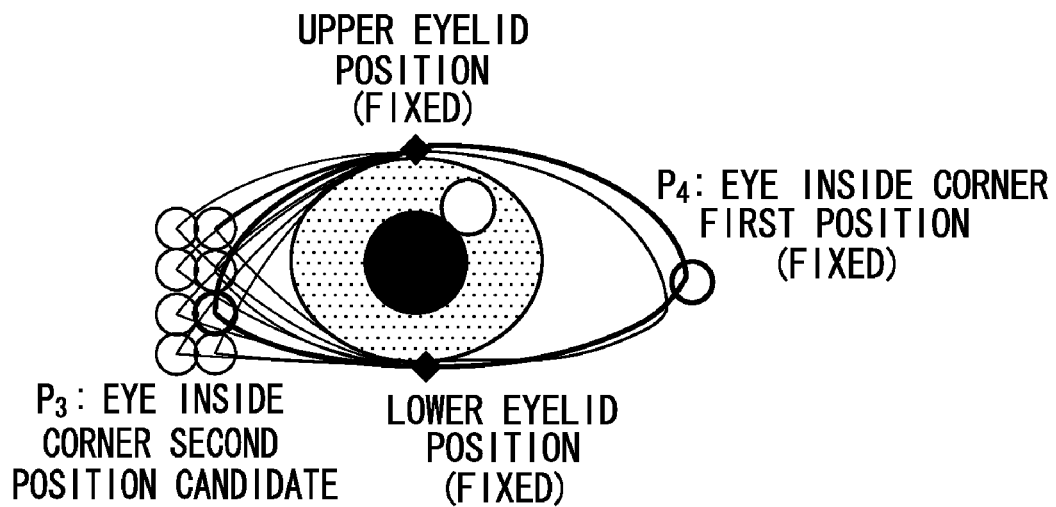
FIG. 12A is an explanatory diagram regarding fitting when there is no noise present.

At step 150, as shown in FIG. 12A, the control point of the upper eyelid position detected by the upper and lower eyelid position detection processing is set as $P_1$, the control point of the lower eyelid position as $P_2$, the eye outside corner first position detected by the eye inside and outside corner position detection processing as the control point $P_4$, and the eye inside corner second position candidate as the control point $P_3'$. The upper eyelid position, the lower eyelid position and $P_4$ are fixed. The upper and lower eyelid profile modeling is then performed by a Bezier curve as defined based on the control points $P_1$, $P_3'$, and $P_4$, and as a Bezier curve defined based on the control points $P_2$, $P_3'$, and $P_4$.

Figure 12B:
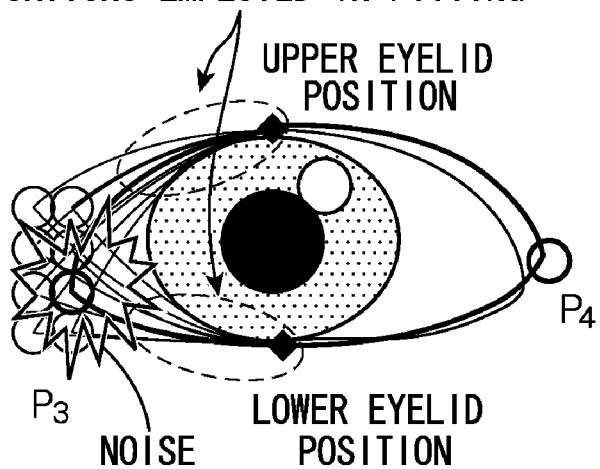
FIG. 12B is an explanatory diagram regarding fitting when noise is present.

Then at step 152 determination is made as to whether or not there is a possibility of noise being present in the vicinity of the eye inside corner by determining whether or not the output value $V_{head}$ computed at step 116 of the eye inside and outside corner position detection processing (FIG. 3) is the threshold value $\alpha$ or greater. Processing proceeds to step 154 when output value $V_{head} \geq \alpha$ and the fitting evaluation value $\lambda$ is then computed according to above Equation (1) using points i on the Bezier curves from control point $P_3$ to control point $P_1$, and from control point $P_3$ to control point $P_2$. However, processing proceeds to step 156 when output value $V_{head} < \alpha$ and, as shown in FIG. 12B, fitting evaluation value $\lambda$ is then computed using only those points i on the Bezier curves in the vicinity of the upper eyelid position and the lower eyelid position. The upper eyelid position vicinity can, for example, be taken as a position on the curve between the control point $P_3$ and the upper eyelid position in a range of ½ to ⅓ the distance from the upper eyelid position. Similar applies to the lower eyelid position vicinity. The computation precision of the evaluation value can be raised by computing the fitting evaluation value λ in this manner not using the eyelid profile in the vicinity of the eye inside corner where noise occurs.

Then at step 158 determination is made as to whether or not the control point $P_3$ has been changed and the fitting evaluation value λ has been computed for all of the positions in the change range. The change range here can, for example, be within the eye inside corner search range 36. Processing returns to step 150 when not all have been computed, the next position for the control point $P_3$ is set, and computation processing of the fitting evaluation value λ is repeated. However, processing proceeds to step 160 when computation processing has been completed for all of the positions, and the position of the control point $P_3$ at the maximum computed fitting evaluation value λ is determined as the eye inside corner second position.

Then at steps 162 to 172, by processing similar to the processing for determining the eye inside corner second position, the control point of the upper eyelid position detected by the upper and lower eyelid position detection processing is set as $P_1$, the control point of the lower eyelid position as $P_2$, the eye inside corner second position determined at step 160 as the control point $P_3'$ and the eye outside corner second position candidates set as the control point $P_3'$. With the upper eyelid position, the lower eyelid position and $P_3'$ fixed the fitting evaluation value λ is then computed while changing control point $P_4'$ and the eye outside corner second position is determined as the position of control point $P_4'$ at maximum fitting evaluation value λ, then processing returns.

As explained above, according to the face feature point detection device of the first exemplary embodiment, the eye inside corner first position and the eye outside corner first position detected by eye inside and outside corner position detection processing are employed in fitting to a first eyelid profile model. The upper eyelid position and the lower eyelid position at maximum fitting evaluation value are employed for performing fitting to a second eyelid profile model and an eye inside corner second position and an eye outside corner second position are determined. Accordingly, the eye inside corner position and the eye outside corner position can be detected with good precision as face feature points even when the eye inside corner or the eye outside corner portions are masked by noise such as reflection from glasses.

Explanation follows regarding a second exemplary embodiment. In the first exemplary embodiment a case has been explained in which the eye inside corner first position and the eye outside corner first position are each detected as only a single point. However, the second exemplary embodiment differs therefrom in that plural candidate points are detected when noise arises. Configuration and processing similar to that of the first exemplary embodiment is allocated the same reference numerals and further explanation is omitted.

Figure 13:
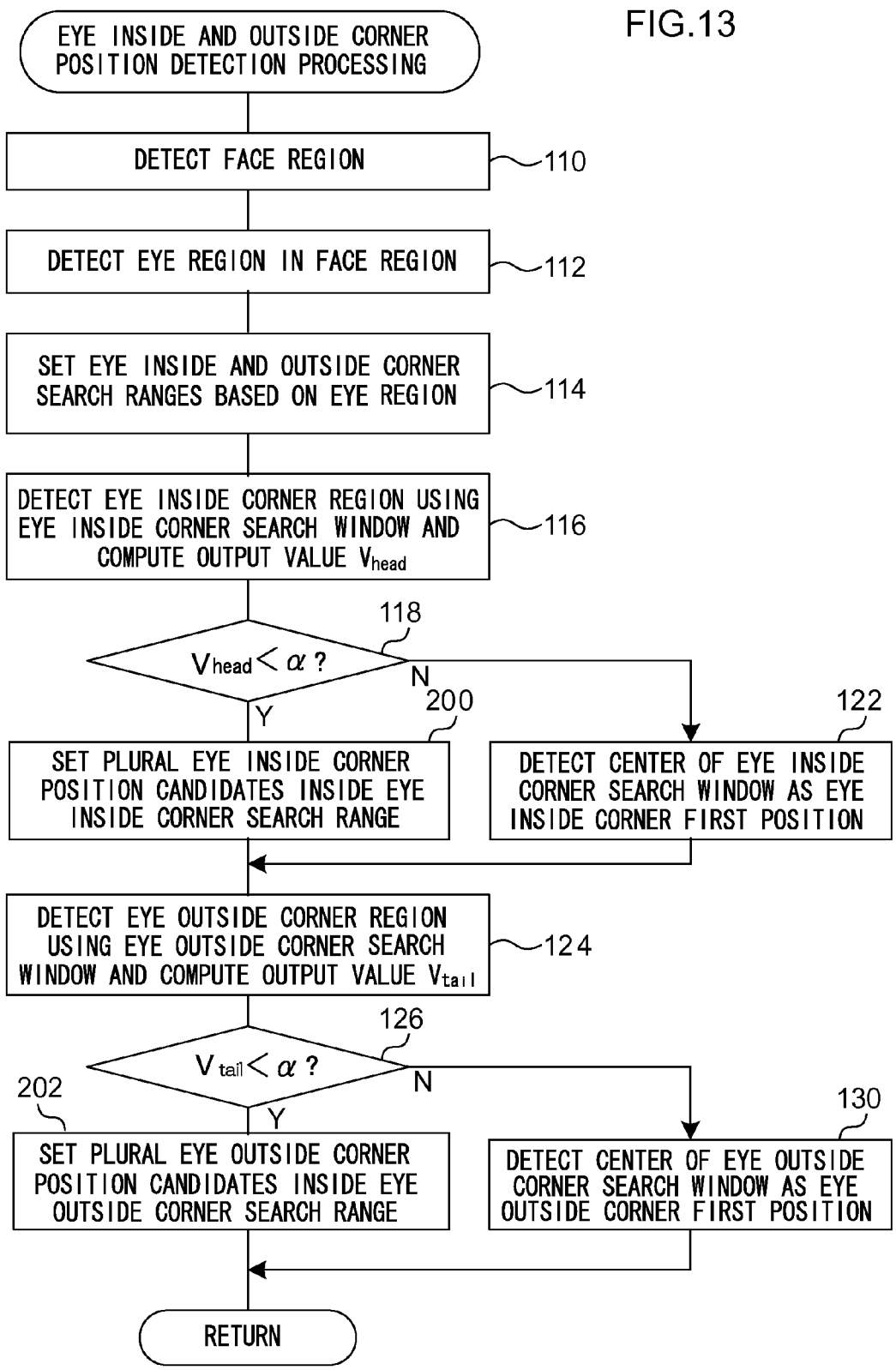
FIG. 13 is a flow chart showing contents of a processing routine of eye inside and outside corner position detection processing in a second exemplary embodiment.

Explanation follows, with reference to FIG. 13, regarding a processing routine of eye inside and outside corner position detection processing in the second exemplary embodiment.

Figure 14:
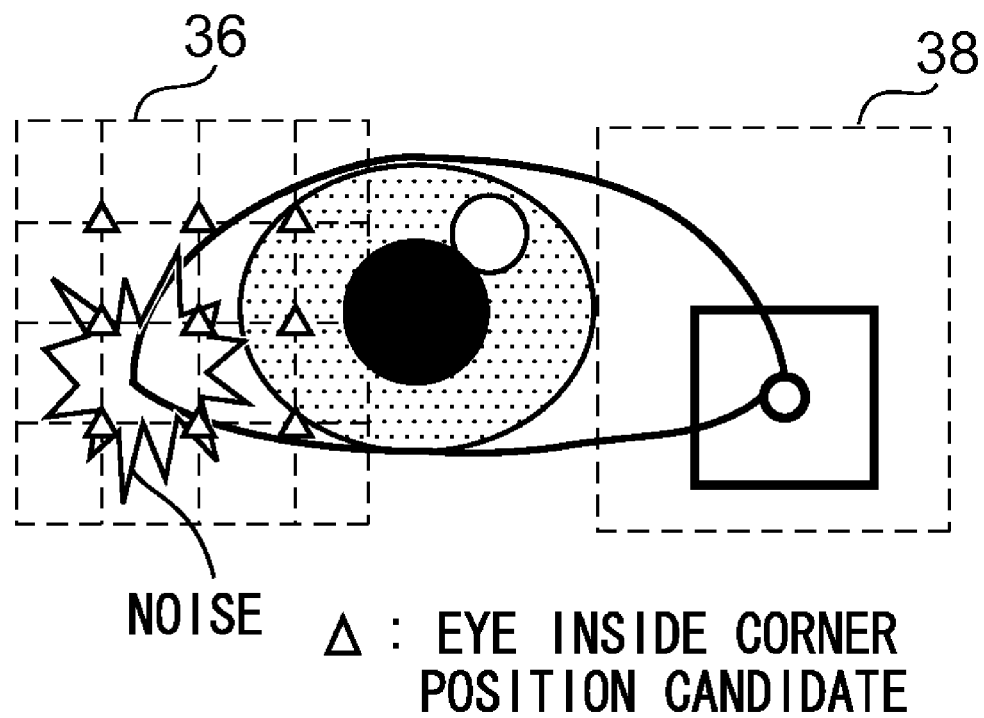
FIG. 14 is an explanatory diagram of setting plural eye inside corner position candidates.

Similarly to the first exemplary embodiment, at step 116 an eye inside corner search window 40, for example of rectangular shape, is scanned over the eye inside corner search range 36, an eye inside corner region is detected, and an output value $V_{head}$ expressing the degree of matching between the image of the eye inside corner region and a template is computed using a method such as template matching. Then at step 118 determination is made as to whether or not $V_{head}$ is smaller than threshold value α. Processing proceeds to step 200 when smaller than threshold value α and, as shown in FIG. 14, plural eye inside corner position candidates are set in the eye inside corner search range 36. Similarly for the eye outside corner position, at step 202 plural eye outside corner position candidates are set in an eye outside corner search range 38 when an output value $V_{tail}$ is smaller than the threshold value α.

Figure 15:
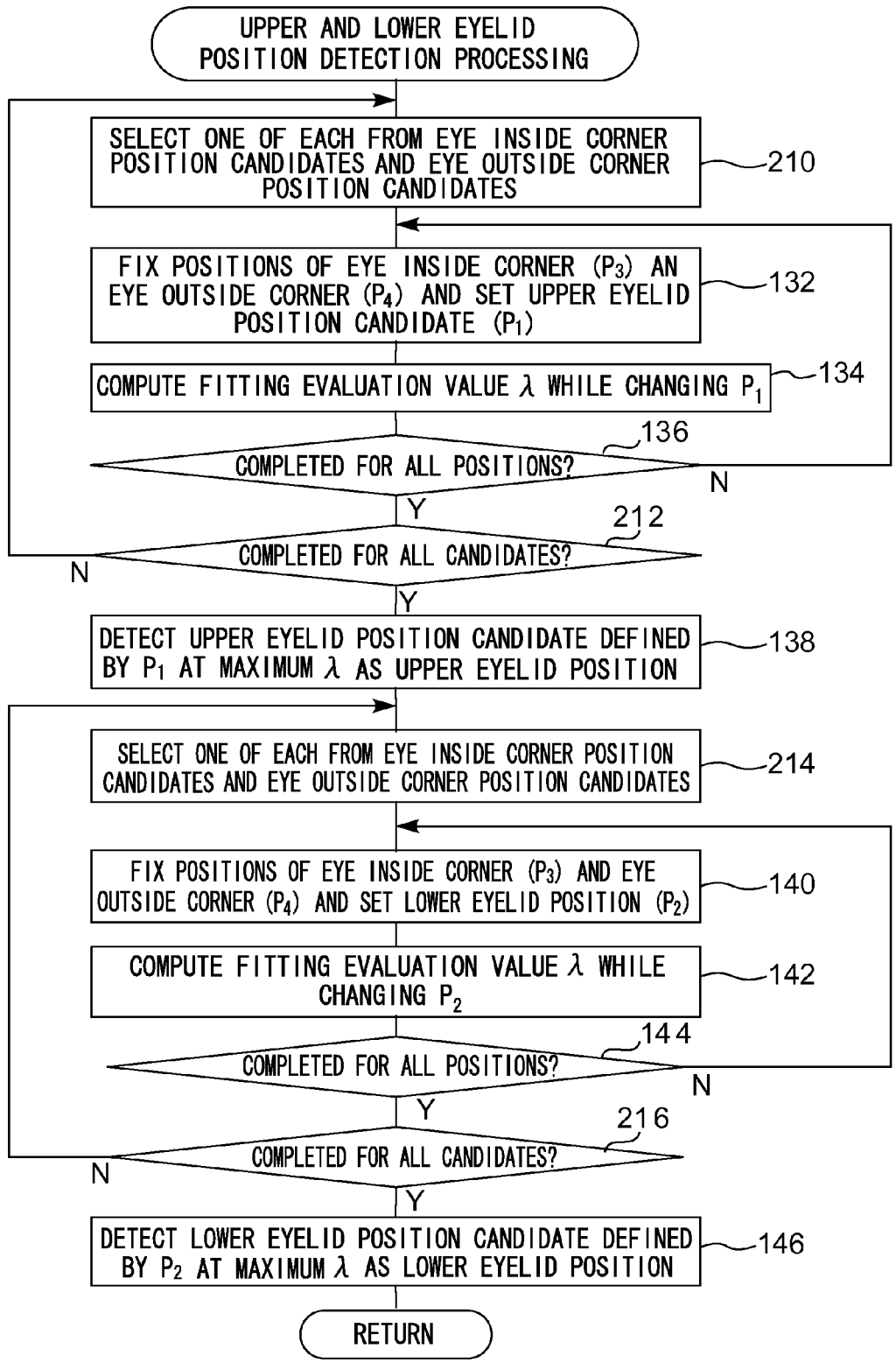
FIG. 15 is a flow chart showing contents of a processing routine of upper and lower eyelid position detection processing in the second exemplary embodiment.

Explanation follows, with reference to FIG. 15, regarding a processing routine for upper and lower eyelid position detection processing in the second exemplary embodiment.

In cases where plural eye inside corner position candidates or plural eye outside corner position candidates have been set by the eye inside and outside corner position detection processing, one each of these is selected at step 210. Then at step 132 the selected eye inside corner position candidate and eye outside corner position candidate are, respectively, fixed as the control point $P_3$ and the control point $P_4$, and then the fitting evaluation value λ is computed at step 134.

Processing proceeds to step 212 when determined at step 136 that fitting has been completed for all of the positions in the change range. At step 212 determination is made as to whether or not all combinations of the eye inside corner position candidates and the eye outside corner position candidates have been selected and processed. Processing returns to step 210 when not all are completed, and the next eye inside corner position candidate and the next eye outside corner position candidate are selected. When all have been completed then at step 138 the upper eyelid position candidate defined by the control point $P_1$ at the maximum fitting evaluation value λ computed out of all the combinations of a first eye inside corner position selected from the eye inside corner position candidates and a first eye outside corner position selected from the eye outside corner position candidates is detected as the upper eyelid position.

Similarly for the eye outside corner position as well, one each of the eye inside corner position candidates and the eye outside corner position candidates are selected at step 214, and detection is made at step 216 as to whether or not the all of the combinations have been selected and processing completed.

As explained above, according to the face feature point detection device of the second exemplary embodiment, when noise is detected during eye inside and outside corner position detection processing to be present in the vicinity of the eye inside corner and/or the eye outside corner then plural candidate points are detected as eye inside corner first positions and/or eye outside corner first positions, and fitting is performed for all combinations of these candidates. Since the upper eyelid position and the lower eyelid position are those detected at the maximum fitting evaluation value, the detection precision of the upper eyelid position and the lower eyelid position is raised, and the precision of determination of the eye inside corner second position and the eye outside corner second position determined employing the upper eyelid position and the lower eyelid position is also raised.

Explanation follows regarding a third exemplary embodiment. The third exemplary embodiment differs from the first exemplary embodiment in the addition of control of the changing range of the control points for detecting the eye inside corner second position and the eye outside corner second position according to the degree of eye openness. Similar configuration and processing to that of the first exemplary embodiment is allocated the same reference numerals and further explanation thereof is omitted.

Figure 16:
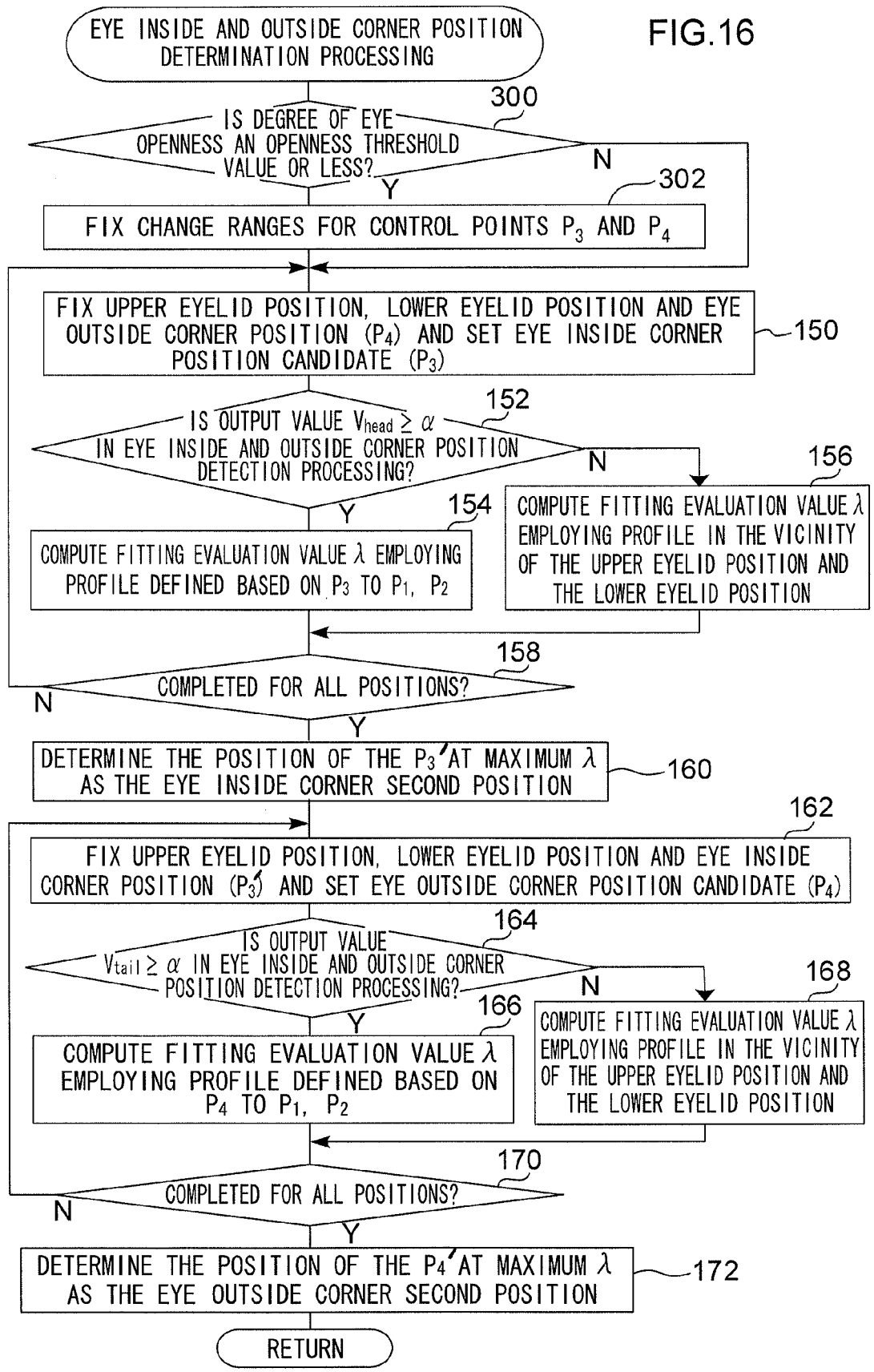
FIG. 16 is a flow chart showing contents of a processing routine of eye inside and outside corner position determination processing in a third exemplary embodiment.

Explanation follows, with reference to FIG. 16, regarding a processing routine for eye inside and outside corner position detection processing in the third exemplary embodiment.

Figure 17:
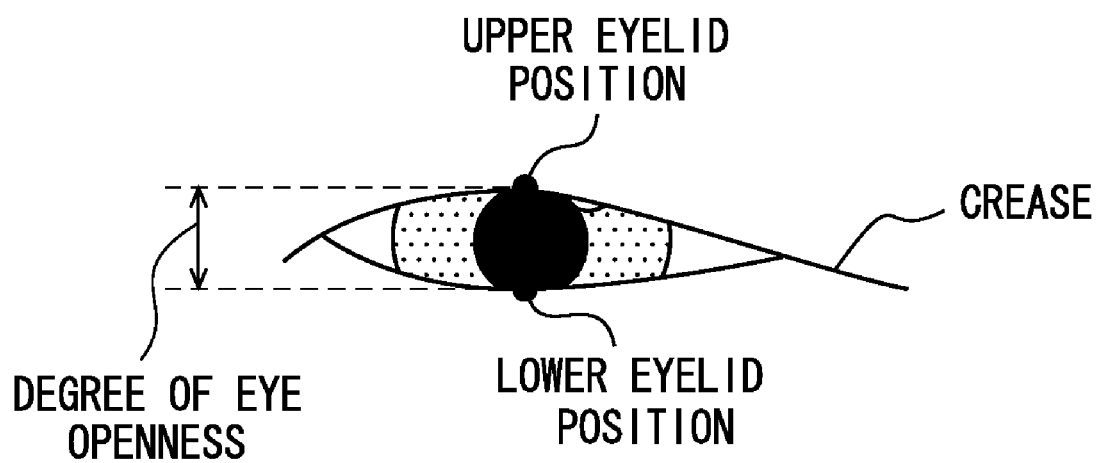
FIG. 17 is an explanatory diagram regarding the influence of degree of eye openness on eye inside corner position and eye outside corner position detection.

At step 300 determination is made as to whether or not the degree of eye openness, expressed by the separation distance between the upper eyelid position and the lower eyelid position detected by the upper and lower eyelid detection processing, is an openness threshold value or lower. As shown in FIG. 17, when the degree of eye openness is small the portions of the eye inside corner and the eye outside corner are affected by occurrences of creases and the like, with the possibility that the eye inside corner position and the eye outside corner position are detected as positions that greatly differ from the actual eye inside corner position and the eye outside corner position. The openness threshold value is preset here with a value that can discriminate a degree of eye openness that will cause problems when determining the eye inside corner position and the eye outside corner position due to being affected as described above. Processing proceeds to step 302 when the degree of eye openness is the openness threshold value or lower. However, processing proceeds to step 150 when openness is greater than the openness threshold value.

The change ranges of the control points $P_3'$ and $P_4'$ are limited at step 302. For example, the eye inside corner second position and the eye outside corner second position determined when the degree of eye openness is the openness threshold value or greater can be stored in a specific storage region, and the ranges can be limited such that the separation distance from these positions is within a specific range. Alternatively the eye region image can be normalized to a specific size (for example 20 pixels vertically and 40 pixels horizontally), and the change ranges can be limited to give a separation distance of 30 pixels worth when the separation distance between the control points $P_3'$ and $P_4'$ is for a face image of a full-on face, and a separation distance of 20 pixels worth when the face image is a semi-profile face) (45°).

In subsequent processing, similar to the eye inside and outside corner position detection processing of the first exemplary embodiment, at step 158 and step 170 determination is made as to whether or not the control points $P_3'$ and $P_4'$ have been changed and the fitting evaluation value λ has been computed for all of the points in the change ranges that were limited at step 302.

As explained above, according to the face feature point detection device of the third exemplary embodiment, even when the degree of eye openness is small, detection with large misalignments of the eye inside corner position and the eye outside corner position, due to being affected by creases and the like occurring in the vicinity of the eye inside corner and the eye outside corner, can be prevented.

Explanation follows regarding a fourth exemplary embodiment. The fourth exemplary embodiment differs from the first exemplary embodiment in the point that the eye inside and outside corner position detection processing is executed repeatedly. Configuration and processing similar to that of the first exemplary embodiment is allocated the same reference numerals and further explanation thereof is omitted.

Figure 18:
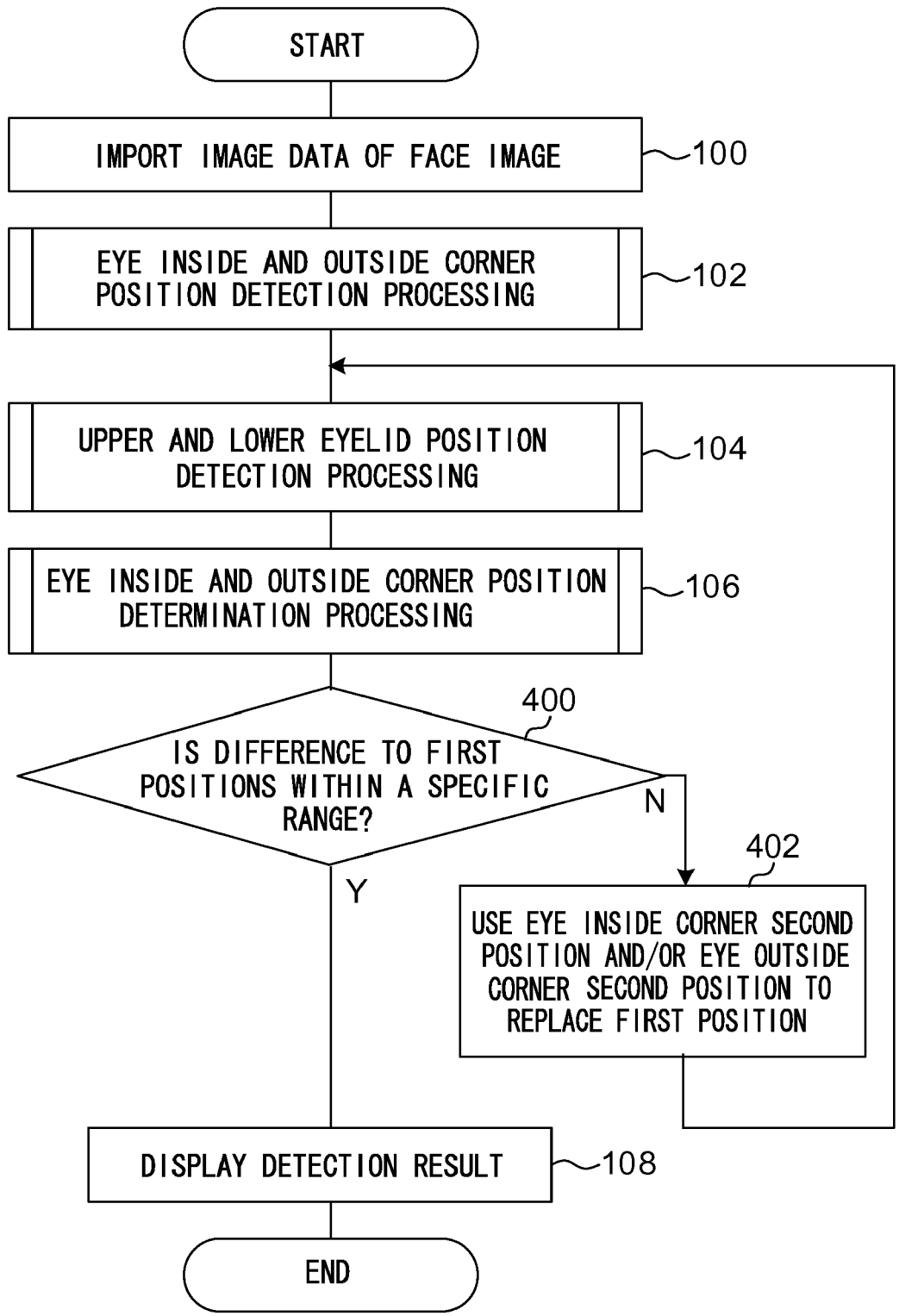
FIG. 18 is a flow chart showing contents of a processing routine of face feature point detection processing in a face feature point detection device of the fourth exemplary embodiment.

Explanation follows, with reference to FIG. 18, regarding a processing routine for face feature point detection processing in a face feature point detection device of the fourth exemplary embodiment.

Image data of a face image is imported at step 100. Then at step 102 eye inside and outside corner position detection processing is executed to detect an eye inside corner first position and an eye outside corner first position. Then at step 104 upper and lower eyelid position detection processing is executed to detect the upper eyelid position and the lower eyelid position. Then at step 106 eye inside and outside corner position determination processing is executed to determine an eye inside corner second position and an eye outside corner second position.

Then at step 400 determination is made as to whether or not any differences from the eye inside corner second position and the eye outside corner second position determined at step 106 to the eye inside corner first position and the eye outside corner first position are within a specific range. Processing proceeds to step 108 when they are within a specific range and the detection result is displayed. However, processing proceeds to step 402 when they are outside of the specific range.

At step 402, the eye inside corner second position and the eye outside corner second position determined at step 106 are used to replace the eye inside corner first position and the eye outside corner first position and then processing returns to step 104. At step 104 the upper eyelid position and the lower eyelid position are re-detected using the eye inside corner first position and the eye outside corner first position that were replaced at step 402, then at step 106 the eye inside corner second position and the eye outside corner second position are re-determined.

As explained above, according to the face feature point detection device of the fourth exemplary embodiment, the eye inside corner second position and the eye outside corner second position, which have been determined more precisely than the eye inside corner first position and the eye outside corner first position detected with the eye inside and outside corner position detection processing, are employed for re-detecting the upper eyelid position and the lower eyelid position, and determination of the eye inside corner second position and the eye outside corner second position is performed until the difference to the eye inside corner first position and the eye outside corner first position is within the specific range. Consequently, the eye inside corner second position and the eye outside corner second position can be determined with good precision.

In each of the above exemplary embodiments explanation has been given of examples in which a fitting evaluation value is computed based on the inner product of a normal vector at the point i on the Bezier curve and a brightness gradient vector of the image, however configuration may be made such that a fitting evaluation value is computed using a horizontal edge strength since a strong horizontal edge appears at the upper and lower eyelids.

Figure 19:
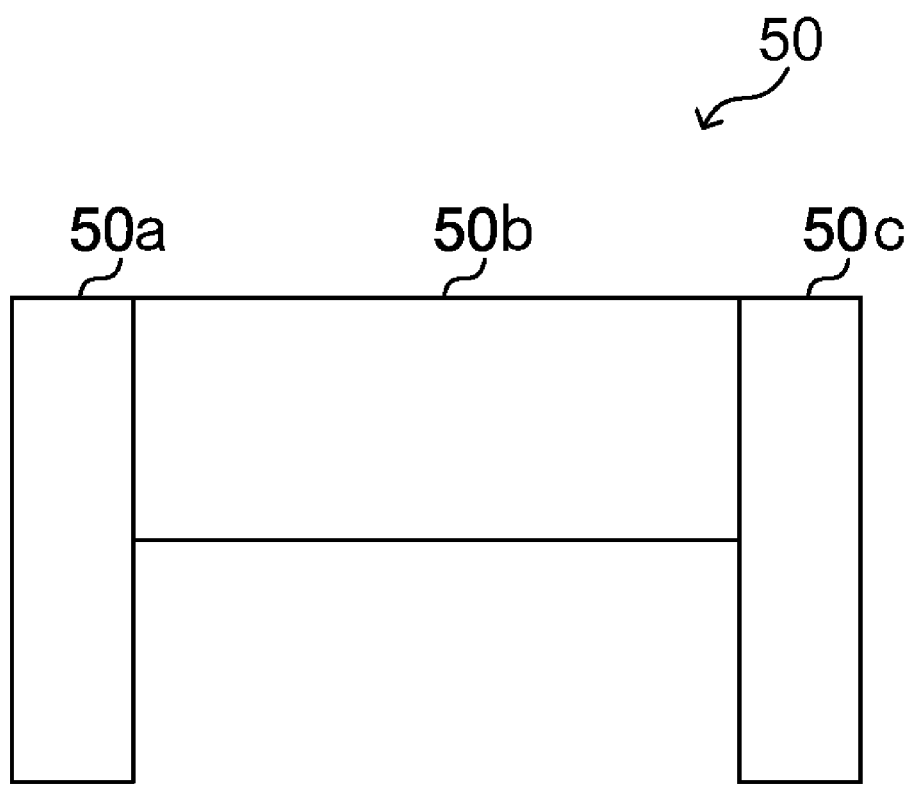
FIG. 19 is an explanatory diagram of an eyelid profile model using an eyelid profile window.

In each of the above exemplary embodiments examples were explained where Bezier curves defined by control points corresponding to the eye inside corner position, the eye outside corner position, and the upper and lower eyelid positions were employed for eyelid profile modeling, however there is no limitation thereto. For example, as shown in FIG. 19, eyelid profile modeling may use an eyelid profile window 50 of an amalgamation of three windows 50a, 50b, 50c. In such cases, the vertical edge strength appearing in the left and right windows 50a, 50c is detected and the horizontal edge strength appearing in the central window 50*b* is detected while scanning the eyelid profile window 50 in an eye search range. Fitting can then be performed using the sum of these strengths.

| Explanation of the Reference Numerals | |
|---|---|
| 10 | FACE FEATURE POINT DETECTION DEVICE |
| 12 | CAMERA |
| 14 | DISPLAY DEVICE |
| 16 | COMPUTER |
| 16d | CPU |

The invention claimed is:

1. A face feature point detection device comprising:
acquiring section that acquires image data for an image including an eye region containing an eye inside corner and an eye outside corner;
position detection section that detects an eye inside corner first position and an eye outside corner first position by pattern matching in the image data acquired by the acquiring section;
first computation section that, in a first eyelid profile model expressing an upper curve and a lower curve, with end points at the eye inside corner first position and the eye outside corner first position detected by the position detection section, and having an upper eyelid position determined on the upper curve as a first parameter and a lower eyelid position determined on the lower curve as a second parameter, computes for each value of the first parameter and each value of the second parameter a first likelihood expressing the degree of matching between the first eyelid profile model while changing the first parameter and the second parameter and an eyelid profile included in the image;
second computation section that, in a second eyelid profile model of the first eyelid profile model having the highest first likelihood computed by the first computation section and having an eye inside corner position as a third parameter and an eye outside corner position as a fourth parameter, computes for each value of the third parameter and each value of the fourth parameter a second likelihood expressing the degree of matching between the second eyelid profile model while changing the third parameter and the fourth parameter and the eyelid profile included in the image; and
position determination section that determines the position expressed by the third parameter and the position expressed by the fourth parameter in the second eyelid profile model at the highest second likelihood computed by the second computation section as the positions of an eye inside corner second position and an eye outside corner second position, respectively.

2. The face feature point detection device of claim 1, wherein:
the second computation section computes the second likelihood by employing at least one of a portion in the vicinity of the upper eyelid position or the lower eyelid position of the second eyelid profile model out of the eyelid profiles included in the image when the degree of matching by pattern matching with the position detection section is less than a predetermined threshold value.

3. A recording medium storing a face feature point detection program causing a computer to function as each of the section configuring the face feature point detection device of claim 2.

4. The face feature point detection device of claim 1, wherein:
the position detection section detects at least one of a plurality of eye inside corner candidate points as an eye inside corner first position or a plurality of eye outside corner candidate points as an eye outside corner first position when the degree of matching by pattern matching is less than a predetermined threshold value; and
the first computation section computes the first likelihood for all combinations of the eye inside corner candidate points and the eye outside corner candidate points in a first eyelid profile model having as end points a single eye inside corner candidate point selected from the plurality of eye inside corner candidate points and a single eye outside corner candidate point selected from the plurality of eye outside corner candidate points.

5. The face feature point detection device of claim 1, wherein the second computation section changes the third parameter and the fourth parameter within a predetermined range when the separation distance between the upper eyelid position and the lower eyelid position in the second eyelid profile model is smaller than a predetermined openness threshold value.

6. The face feature point detection device of claim 1 further comprising control section that, when at least one of a difference between the eye inside corner second position determined the current time by the position determination section and the eye inside corner first position, or the difference between the eye outside corner second position determined the current time by the position determination section and the eye outside corner first position is greater than a difference threshold value predetermined the previous time, controls so as to use at least one of the eye inside corner second position, the eye outside corner second position determined the current time to replace the eye inside corner first position, or the eye outside corner first position, and then controls to re-determine an eye inside corner second position and an eye outside corner second position.

7. A recording medium storing a face feature point detection program causing a computer to function as:
acquiring section that acquires image data for an image including an eye region containing an eye inside corner and an eye outside corner;
position detection section that detects an eye inside corner first position and an eye outside corner first position by pattern matching in the image data acquired by the acquiring section;
first computation section that, in a first eyelid profile model expressing an upper curve and a lower curve, with end points at the eye inside corner first position and the eye outside corner first position detected by the position detection section, and having an upper eyelid position determined on the upper curve as a first parameter and a lower eyelid position determined on the lower curve as a second parameter, computes for each value of the first parameter and each value of the second parameter a first likelihood expressing the degree of matching between the first eyelid profile model while changing the first parameter and the second parameter and an eyelid profile included in the image;

second computation section that, in a second eyelid profile model of the first eyelid profile model having the highest first likelihood computed by the first computation section and having an eye inside corner position as a third parameter and an eye outside corner position as a fourth parameter, computes for each value of the third parameter and each value of the fourth parameter a second likelihood expressing the degree of matching between the second eyelid profile model while changing the third parameter and the fourth parameter and the eyelid profile included in the image; and position determination section that determines the position expressed by the third parameter and the position expressed by the fourth parameter in the second eyelid profile model at the highest second likelihood computed by the second computation section as the positions of an eye inside corner second position and an eye outside corner second position, respectively.

* * * * *